US007843196B2

(12) United States Patent
Teklemariam et al.

(10) Patent No.: US 7,843,196 B2
(45) Date of Patent: Nov. 30, 2010

(54) COMPACT WHOLE-BODY OPEN MAGNET FOR MAGNETIC RESONANCE IMAGING

(75) Inventors: Grum Teklemariam, Washington, DC (US); Jianyu Lian, Westford, MA (US)

(73) Assignee: XBO Medical Systems Co., Ltd., Baotou, Inner Mongolia (CN)

(*) Notice: Subject to any disclaimer, the term of this patent is extended or adjusted under 35 U.S.C. 154(b) by 1097 days.

(21) Appl. No.: 10/943,703

(22) Filed: Sep. 17, 2004

(65) Prior Publication Data

US 2005/0146329 A1 Jul. 7, 2005

Related U.S. Application Data

(60) Provisional application No. 60/505,014, filed on Sep. 19, 2003.

(51) Int. Cl.
*G01V 3/00* (2006.01)

(52) U.S. Cl. ........................ 324/319; 324/320; 335/296

(58) Field of Classification Search ................. 324/319, 324/320, 318, 300; 335/296, 297
See application file for complete search history.

(56) References Cited

U.S. PATENT DOCUMENTS 4,723,116 A * 2/1988 Muller et al. ............... 335/296
5,134,374 A * 7/1992 Breneman et al. ........... 324/319
5,539,366 A * 7/1996 Dorri et al. ................. 335/297

* cited by examiner

*Primary Examiner*—Louis M Arana
(74) *Attorney, Agent, or Firm*—Lambert & Associates; Adam J. Bruno; Gary E. Lambert

(57) ABSTRACT

A compact whole-body open circular magnet system for MRI purposes includes a protrusion overhanging the central homogeneous field region. The overhanging protrusion permits a reduction of the total magnet homogeneity requirements of the MRI system. Further reducing the radius of this protrusion increases access to a patient under examination but diminishes the homogeneity. Active shimming means incorporated in a gradient coil can regain the original homogeneity while maintaining increased patient access.

8 Claims, 2 Drawing Sheets

12
16

COMPACT WHOLE-BODY OPEN MAGNET FOR MAGNETIC RESONANCE IMAGING

PRIORITY CLAIM

This application claims priority from U.S. Provisional Application 60/505,014, filed Sep. 19, 2003.

BACKGROUND OF THE INVENTION

The present invention relates to a compact magnetic field generating apparatus for an open whole body magnetic resonance imaging machine. The compact magnetic field generating apparatus is used in conjunction with a gradient magnetic field coil. A preferred such coil is disclosed in co-filed U.S. patent application "Cylindrical Biplanar Gradient Coil for Magnetic Resonance Imaging" of G. Teklemariam et al, the subject matter of which is incorporated herein by reference). Together the magnetic field generating apparatus and the gradient coil produce a static uniform magnetic field.

SUMMARY OF THE INVENTION

This invention is directed to a compact whole body magnet system for an open bi-planar MRI system having a cylindrical central homogeneous field region and having magnets displaced above and below said region and separated by a patient gap into which a patient can fit along with other needed elements. The magnets are connected by a yoke to form a magnetic circuit element, and the magnets each have attached to them circular discs forming a pole face in the space facing the patient gap. The pole face has annular protrusions at its outer edge which protrusions overhang beyond the circular discs and face toward the patient gap. The pole face has a radius of about 40 to 45 cm (as compared to 55-60 cm in current commercially available MRI systems). The system further contains electrical active means to homogenize the field within the gap. The magnet gap generally ranges from about 40 to 50 cm (as compared to about 60 cm in current commercially available MRI systems). Thus the ratio of the length of the overhang to the length of the magnet gap is less than 1, preferably less than 0.9.

The invention is also directed to a compact whole body magnet system for an open MRI system having a cylindrical central homogeneous field region extending between two planar surfaces with a patient gap comprising a magnet physically and magnetically attached to a circular magnet pole wherein the ratio of the magnet pole radius to the patient gap is more than 1.

DETAILED DESCRIPTION OF THE INVENTION

Figure 1A:
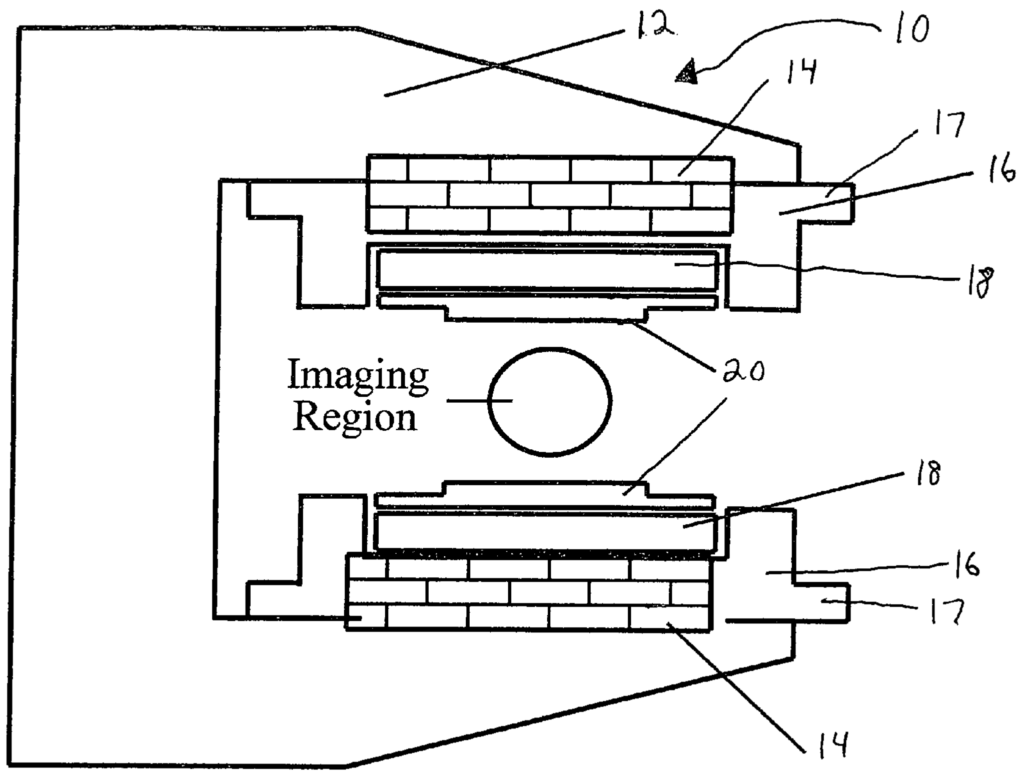
FIG. 1*a* is a cross-sectional view of an open magnetic resonance imaging (MRI) machine containing a magnet system in accordance with the present invention.
Figure 1B:
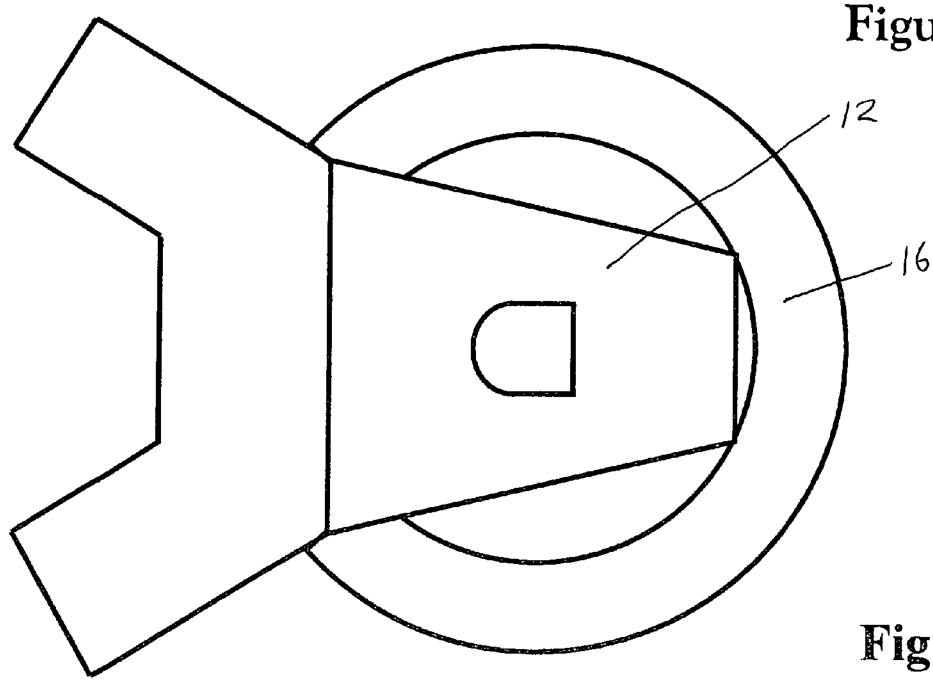
FIG. 1*b* is a top view of the MRI machine of FIG. 1*a*.

The magnetic resonance imaging apparatus 10 is constructed as shown in FIGS. 1*a* and 1*b*. It has a magnetic yoke 12 magnetically connected to a magnetic circuit arrangement comprising a pair of permanent magnet blocks 14 each attached to the surface of a pole 16, which has annular protrusions 17 for field shaping. The magnet blocks 14 also have space for magnetic field gradient coil assemblies 18 and rf coil assemblies 20, disposed opposite each other so as to define a gap which is used as the imaging region. The permanent magnet blocks 14 are magnetically connected by the yoke 12 to generate a magnetic field in the gap. The gap has sufficient opening to insert a patient in it for the purposes of obtaining tomographic images. The apparatus is specifically designed for magnetic resonance imaging (MRI) purposes although other applications that require the use of a static uniform magnetic field may also be performed with the system.

The insertion gap used as an imaging region, is required to have a magnetic strength greater than 1,000 gauss (0.1 T) and a uniformity less than 100 ppm (parts per million) throughout to obtain images of sufficient clarity. The imaging region is large enough to image a human being. It has a diameter spherical volume (DSV) of about 20 to about 35 cm, most preferably about 20-30 cm. The DSV is critical to determining the dimensions of the gap and the diameter of the pole pieces of a suitable magnet.

Figure 2A:
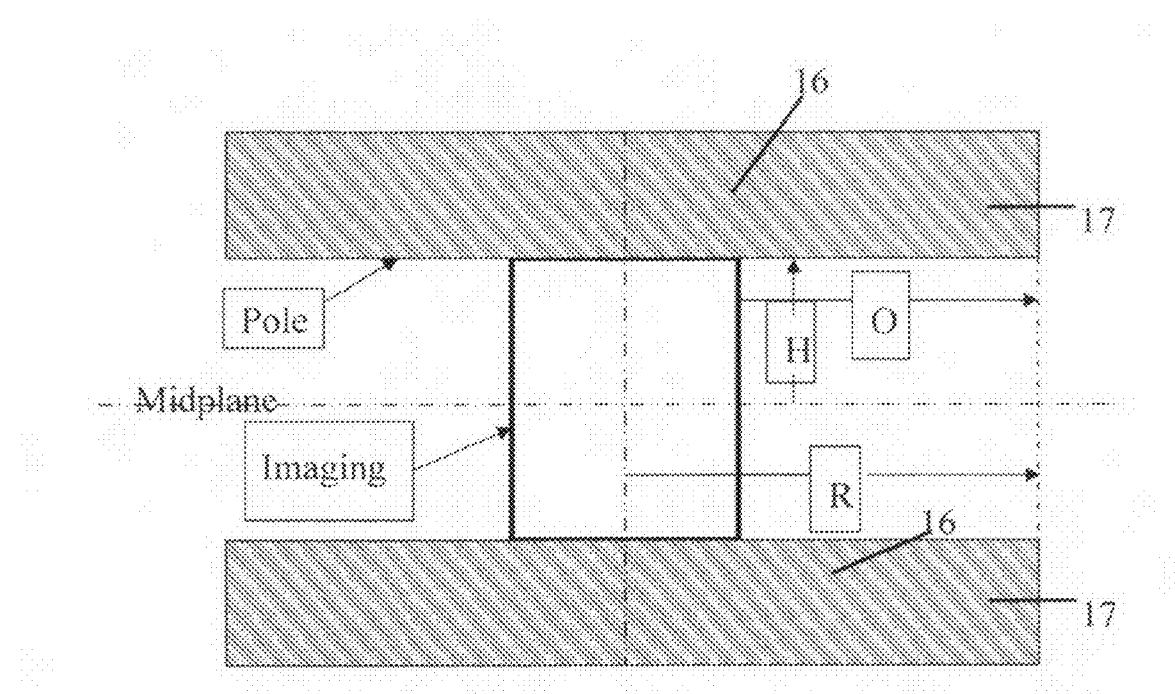
FIG. 2*a* is a cross-sectional view of a magnet system of this invention showing schematically the relation between the imaging region where homogeneous field conditions exist and the gap and overhang dimensions.
Figure 2B:
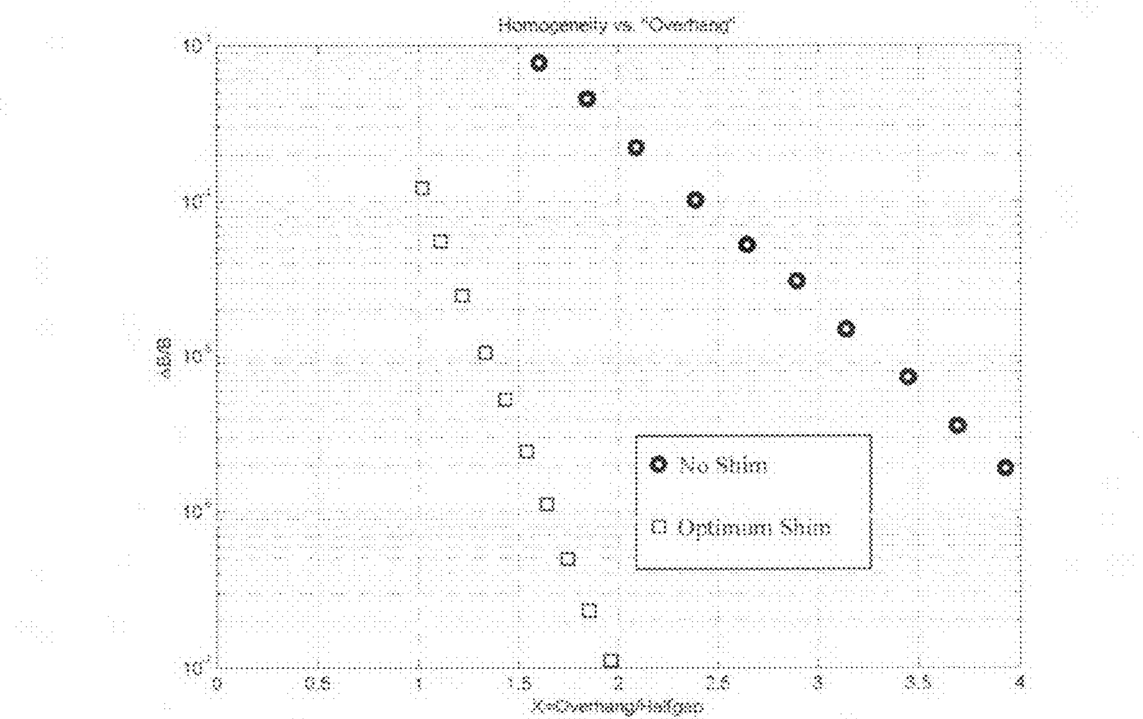
FIG. 2*b* is a graph showing the accuracy "X" that can be obtained as a function of the ratio of the overhang ("O") to the half-gap ("H") by the use of active shimming.

FIG. 2*a* shows schematically the relation between the imaging region and the gap dimensions. Once a gap opening has been selected (defined as the "half-gap") for a particular image to obtain a certain region of homogeneity, a pole piece is used which is greater in diameter than the homogeneous region (the "overhang") to achieve sufficient magnetic field uniformity or accuracy. FIG. 2*b* shows the accuracy "X" that can be obtained as a function of the ratio of the overhang ("0") to the half-gap ("H"). The total radius of the pole is ("R").

For a given accuracy X, field shaping or shimming can be used to significantly improve the accuracy. The process of shimming starts from coarse field shaping to finer steps as the accuracy is improved. The coarse steps start initially by adding annular protrusions to the pole pieces improving the accuracy by up to 100 ppm. Then a process of finer shimming achieved through adding small high magnetic permeability elements on the surfaces of the pole pieces facing the gap. This process entails mapping the magnetic field generated in the imaging region between the gaps and adding high elements to correct the field homogeneity. The magnetic field in the gap is iteratively mapped and remapped to check the improvement in homogeneity, and starting at the outer diameters, inside the annular region of the pole pieces, high elements are added or removed along smaller and smaller diameters until the center is reached and an accuracy well under 50 ppm overall homogeneity in the imaging region is achieved. The size and hence the corrective strength of the elements gets smaller as the diameter gets smaller. This shimming process is what is depicted in the graph of FIG. 2*b* as optimum shimming.

The shimming steps thus described fall under the category of "passive" shimming. A further and finer method of shimming uses an "active" means of shimming. Practitioners in the art of magnetic field design analyze the uniformity of a magnetic field generated in a region by performing a harmonic decomposition of the field on a chosen diameter of a sphere. This decomposition leads to a series expansion of the field in terms of spherical harmonics with the coefficients of each harmonic determining how much of the field is composed of that harmonic. In designs that seek to generate uniform fields the leading order or harmonic, the constant term, is the desirable part of the harmonic decomposition. The constant term dominates the other orders by factors of up to 100,000. Here, corrective current coils are designed to generate various orders of the spherical harmonics starting at the low orders through the higher ones.

The preferred gradient coil contains within it $0^{th}$, $1^{st}$, $2^{nd}$ and higher order spherical harmonic current coils, which generate shim fields to adjust the performance of the magnet. There are 1 $0^{th}$ order, three $1^{st}$ order, and five $2^{nd}$ order coils for a total of nine active shimming coils. Higher order shimming, e.g. $3^{rd}$, $4^{th}$, $5^{th}$, arid even higher orders may be useful in certain cases and incorporated within the gradient coil as well Once the magnetic field has been mapped and decomposed in terms of its spherical harmonics, then the active means of shims can be applied to cancel all higher order harmonics that remain beyond the $0^{th}$ order up to the $2^{nd}$ order as a final shimming step following the passive shimming described above. This allows a much-refined field shimming capability.

With the fine shimming capability of the present invention, another 50 ppm or more of shimming is possible when using the magnet design of this invention.

For example, a conventional large magnet system in which the magnet had a diameter of 118 cm, a half gap of 28 cm, and an overhang of 52 cm measured on a phantom was found to produce about 0.2 ppm of overall variation on a 21 cm DSV. The 0.2 ppm overall variation is far lower than needed for commercial MRI performance. An overall variation limit for commercial MRI systems is about 10 ppm. Thus as the amount of the overhang is reduced, the overall variation increases. And at an overhang of 34 cm, the overall variation for the system increases to 10 ppm. Thus, the present invention allows a system to have a far smaller overhang, which reduces the magnet demands and makes patient access far easier. More importantly, this system can hold for several hours at a time despite overall magnetic field drifts due to ambient temperature variations of up to 5° C. These results were obtained using the active shims in the preferred gradient coils.

Generally the size/volume, weight and cost of the magnet system are a strong function of the imaging volume. A goal of the present invention is to reduce the magnet size, weight and cost by greater than 50% while still maintaining an adequate imaging region. Thus, a magnet in accordance with the present invention having an overall diameter of 89 cm, a half-gap of 23 cm, and an overhang of 32 cm, produces less than 10 ppm overall variation on a 25 cm DSV. The ratio of the radius, R, equal to 44.5 cm to twice the half-gap (or the gap) equal to 46 cm is then less than 1.0. This is in contrast to the conventional design considered above with R=59 cm and a gap equal to 56 cm giving a radius to gap ratio greater than 1.0.

A 4 ppm uniformity is achieved on a 20 cm DSV while reducing the size and weight of the magnet by 58%.

Since the overall system design, complexity and cost of MRI systems is dominated by the choice of magnet, the choice forms the basic platform and determines many of the overall design parameters and capabilities of the MRI system. Together with the gradient coil system these two main subsystems of the MRI scanner are the dominant determinants of the performance of a MRI system.

There are two main categories of MRI scanners: whole-body and dedicated systems. Whole-body systems can scan the entire body. High field systems (more than 10,000 gauss) are based on superconducting magnets while low field systems (about 5,000 gauss and less) are based on permanent magnets and to a lesser extent on electrical coils. Dedicated systems are primarily permanent magnet based and are targeted for scanning specific anatomical regions, typically extremities or head only scanners. The primary advantage of a dedicated system is a lower price derived from a smaller magnet system both in weight and size.

The present invention relates to a magnet system that is intermediate in size between a dedicated and whole-body system. Even though it is smaller in size and weight than present whole-body systems, it is able to perform whole-body scanning because it is an open system.

The magnet type, depicted in FIG. 1, is an open magnet. Preferably the magnet is a permanent magnet. Permanent magnets are available as pre-energized blocks and the flux they generate is smoothed out by the magnet pole faces and guided into the gap or imaging region where the subject is placed.

In the description above, obtaining optimum shimming is key to generating the required uniformity for MRI purposes. The preferred gradient coils contain correction coils in the assembly that allow obtaining a further 100 ppm or more field shaping capability. The combination of the gradient coil system combined with the magnet described above allows a drastic reduction in the size of the magnets required to produce a useful MRI system.

The advantages of the present magnet system for MRI applications are manifold. First and foremost, it provides a significant price reduction because the volume of permanent magnet blocks required is reduced, generally by more than 25%, preferably by more than 50%, and most preferably by more than 55%, and magnet cost is the major cost of an MRI system. The magnet volume reduction further translates into similar reductions of operating power requirements for the RF and gradient coil systems. This analysis was performed for permanent magnet systems. Similar reductions can be obtained for both superconducting and electrical coil magnet systems used in higher strength fields.

Since the volume of permanent magnet blocks strongly scales with the radius of the magnet squared, reducing this dimension yields a big reduction in magnet volume. The trade-off is a loss in imaging volume. This loss is not very significant since the majority of MRI scans are performed on the head and spine. The demands for abdominal scans are growing and these scans can still be performed with the present design. This is accomplished by reducing the patient gap to about 36 cm to regain some of the lost homogeneity while maintaining sufficient access for whole-body imaging. Thus whole-body images can be obtained despite the reduced imaging volume. There may be some scans involving large fields-of-view (FOV) that will require more than a single scan to cover a patient's entire region, i.e. first one-half of the region will be scanned and then a second scan can be used for the other half.

A further benefit of the present magnet design is that good results are obtained when the ratio of the pole radius to the magnet gap is about 1 and below because the degree of access to a patient increases as the ratio becomes smaller.

What is claimed is:

1. A compact whole body magnet system for an open bi-planar MRI system having a cylindrical central homogeneous field region comprising planar magnets displaced above and below said region and separated by a gap into which a subject can fit, said magnets being connected by a yoke to form a magnetic circuit element, said magnets each having attached to them circular discs forming a pole face in the region facing the gap, said pole face having annular protrusions at its outer edge wherein the protrusions face toward the gap, said planar magnets, circular discs and annular protrusions overhang said cylindrical central homogeneous field region creating a overhanging region, said overhanging region reduced to gain access to a patient under examination combined with electrical active means to homogenize the deteriorated magnetic field within the gap.

2. The magnet system of claim 1, wherein the electrical active means to homogenize the magnetic field within the gap is located within gradient coils attached to the circular discs.

3. The magnet system of claim 2, wherein the gradient coils are shielded.

4. The magnet system of claim 3, wherein the shielded gradient coils include nine or more multiple order, mutually orthogonal active shim elements.

5. The magnet system of claim 1, wherein the length of the overhang is about 30 to 35 cm.

6. A compact whole body magnet system for an open MRI having a cylindrical central homogeneous field region extending between two planar surfaces with a patient gap, wherein a magnet physically and magnetically attached to a circular magnet pole wherein the ratio of the magnet pole radius to twice the patient half-gap is less than 1.

7. The magnet system of claim 6 in combination with a gradient coil containing active shims.

8. A method of making a reduced aspect ratio magnet having a magnet pole radius-to-patient gap ratio of less than 1 usable for MRI purposes comprising placing multiple order active shims within a gradient coil and activating said shims.

* * * * *